July 19, 1966 W. L. PORTER 3,261,739
LAMINATED GLASS
Filed March 22, 1961
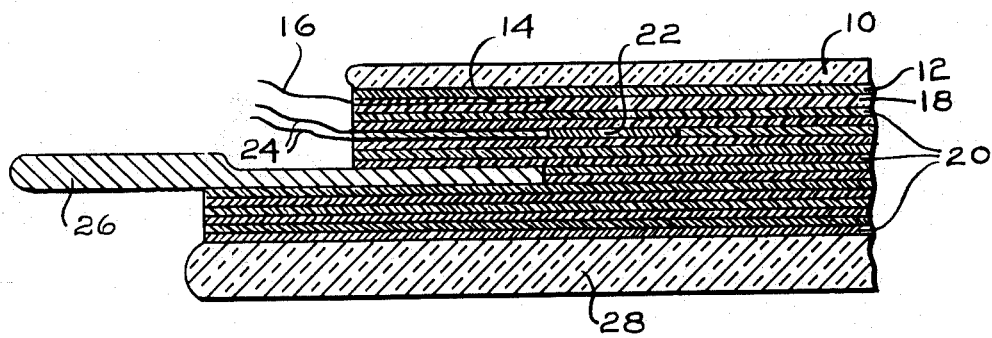
INVENTOR.
WILLARD L. PORTER
BY
Clarence R. Patty, Jr.
ATTORNEY

United States Patent Office 3,261,739
Patented July 19, 1966

3,261,739
LAMINATED GLASS
Willard L. Porter, Corning, N.Y., assignor to Corning Glass Works, Corning, N.Y., a corporation of New York
Filed Mar. 22, 1961, Ser. No. 97,688
3 Claims. (Cl. 161—193)

This invention relates to laminated glass structures and more particularly to an improved interlayer for laminated safety windows exposed to temperature extremes.

In the past a wide variety of laminated glass interlayer materials have been used, many of which were used in conjunction with an equally wide variety of softening agents, plasticizers, adhesives and the like. One such interlayer, in extensive use for windows in automobiles, commercial and military air or space vehicles, and various other safety applications, is polyvinyl butyral. To produce the best suited laminated window interlayer for these various applications, the plasticizer content is varied.

A typical air vehicle laminated windshield comprises a relatively thin outer glass sheet with its interior or cabin surface provided with an electrically conducting film and adjacent to said conducting film a number of layers or sheets of polyvinyl butyral covered by a substantially thicker, tempered inner glass sheet. Bus bars are positioned at the windshield edge area, between the conducting film and the interlayer, to provide an electrical connection to the conducting film. Insulated terminal blocks are mounted in the windshield frame for electric-power and temperature-sensing-element leads. Electric current is supplied to the conducting film as part of the initial air vehicle warm-up and remains on during the entire flight. The temperature sensing element controls the electric current input, to maintain a constant temperature of approximately 120° F. at all times. At this temperature the windshild has both de-icing and de-fogging capabilities.

There are two important safety features of such a windshield, other than de-icing and de-fogging. First, it resists penetration by birds flying into it or by birds being hit by it. Secondly, the polyvinyl butral interlayer possesses sufficient strength to maintain cabin pressure by itself should both sheets of glass be damaged at high altitudes. These two safety features are considered essential for both military and commercial air vehicles and the described windshield provides this safety with materials used heretofore. However, the use of such materials presents at least one serious disadvantage in that the low temperature characteristics of polyvinyl butyral together with the great difference of thermal expansion and contraction between polyvinyl butyral and glass, results in questionable reliability and service life under flight conditions.

Modern air and space vehicles fly at altitudes at which temperatures of −65° F. to −100° F. or even lower are encountered. At these temperatures the polyvinyl butyral interlayer becomes extremely hard and will tend to shrink in size substantially more than the glass sheets. Due to this difference in thermal contraction, together with the restraining forces, produced in the glass sheets as a result of the cohesion between the interlayer and the glass sheets, the interlayer will pull chips of glass away from or produce checking at, the edges of the glass sheet, which chips or checks in turn become a source of complete windshield failures. On the other hand, should cohesion between the interlayer and the glass sheet be low, the windshield will delaminate in the edge area. These difficulties exist even though the windshields are heated, because the heat is localized between the bus bars, permitting the glass sheet edge areas to become very cold. Due to the temperature gradient across the laminated windshield, only the outer glass sheet is usually effected by such chipping or checking.

In practice such laminated glass structures are replaced to prevent complete failures when said chips or checks are discovered or when the edge area delaminates. This preventive action results in a very short service life for such structures. Furthermore, the reliability is low since complete failure may occur before detection of said chipping or checking can take place.

A specific object of this invention is to provide a laminated glass structure capable of withstanding temperature extremes without chipping or checking at the glass edge.

Another object is to provide an improved laminated glass structure with de-icing provisions.

Still another object is to provide an improved laminated glass structure with de-fogging provisions.

A further object is to provide an improved laminated glass structure capable of withstanding penetration by birds flying into it, while it is mounted in a moving vehicle.

A still further object is to provide an improved laminated glass structure having an interlayer capable of maintaining an air or space vehicle cabin pressure, without loss, when the glass is damaged or missing.

An additional object is to provide an improved laminated glass structure having greater reliability and a longer service life.

The above objects are achieved by the laminated glass structure of the present invention, wherein the interlayer is composed of a combination of a synthetic resinous material and a transparent organosilicon elastomer with said transparent organosilicon elastomer disposed between the glass and the synthetic resinous material to form a flexible shear plane.

Additional objects, features and advantages of the present invention will become apparent, to those skilled in the art, from the following detailed description and the attached drawing.

The drawing shows a fragmentary horizontal sectional view of a laminated air vehicle glass structure made in accordance with this invention.

More particularly the drawing illustrates an improved electrically conducting laminated glass structure of the general type used in air vehicle glazing. The outer glass sheet 10, is provided with an electrically conducting film 12, shown in exaggerated thickness, together with a bus bar 14, also shown in exaggerated thickness. Said bus bar is a metallic coating which has a lead-in wire 16, attached. The structure interlayer comprises a layer of transparent organosilicon elastomer 18, positioned adjacent to the electrically conducting film 12 and the bus bar 14, and as many plastic layers 20, as are required for a desired thickness, in which plastic layers a temperature sensing element 22, with its lead-in wires 24 attached, and a structure frame 26, are disposed. The inner glass sheet 28 is positioned adjacent said plastic layers. The plastic layers are preferably formed of synthetic resinous material such as polyvinyl butyral, however, different plastics varying in thickness and physical characteristics may be employed and the invention is not limited to the use of any particular plastic.

By the term transparent organosilicon elastomer is meant a substance generally comprising a vulcanized mixture consisting essentially of (1) a filler of a finely divided solid having a pore volume of at least 3 cc. per g., said solid being a copolymer of (a) from 1 to 50 mol percent of $RSiO_{3/2}$ units wherein each R is an aliphatic hydrocarbon radical of less than 5 carbon atoms, (b) from 4 to 30 mol percent of $$(CH_3)_nSiO_{4-n/2}$$

units wherein $n$ is 2 or 3, and (c) from 46 to 95 mol percent of $SiO_2$ units, and (2) an organopolysiloxane in which at least 50 mol percent of the polymer units are $(CH_3)_2SiO$ units, any remaining polymer units being of the formula $$R'mSiO_{4-m/2}$$

wherein each $R'$ is a monovalent hydrocarbon radical of less than 10 carbon atoms and $m$ has an average value of 1.9 to 2.1 inclusive. The proportion of filler in the elastomer is not critical although preferably the amount of filler should range from 5 to 50 parts by weight based on 100 parts by weight of the polymer.

A preferred embodiment of said transparent organosilicon elastomer comprises 100 parts of a copolymer gum composed of 92.358 mol percent dimethylsiloxane, 7.500 mol percent phenylmethylsiloxane and 0.142 mol percent methylvinylsiloxane, 30 parts by weight filler, 3 parts by weight ethylpolysilicate and 0.2 part by weight dicumyl peroxide. The said filler is prepared by reacting 657 ml. of a cohydrogel having a density of 0.071 g. of total solids per ml. and having a composition of 80 mol percent $SiO_2$ units and 20 mol percent $MeSiO_{3/2}$ units, with 800 ml. of hexamethyldisiloxane. The resulting filler has a bulk density of 0.056 g. per cc. and a composition of 63.6 mol percent $SiO_2$ units, 15.9 mol percent $MeSiO_{3/2}$ units and 20.5 mol percent $MeSiO_{.5}$ units. It has been found that such a transparent organosilicon elastomer does not materially change in viscosity between the maximum and minimum operating temperatures of air vehicles and has excellent adhesion to glass, electrically conducting films and polyvinyl butyral. When a single layer having a thickness of approximately .025" to .040" is interposed between the outer glass sheet 10, and the plastic layers 20, a flexible shear plane is produced that absorbs the stresses, due to the expansion and contraction differentials, which would otherwise exist between said glass sheet and said plastic layers. By itself the said transparent organosilicon elastomer does not have the strength to maintain cabin pressure when the glass sheets 10 and 28 fail, and cannot withstand the bird-penetration test. However, such a transparent organosilicon elastomer in combination with a plastic layer such as polyvinyl butyral will produce an interlayer for a laminated glass structure which will have all of the safety features of present structures and in addition will substantially prolong service life and increase reliability by eliminating edge chipping and checking which are characteristic causes of present total structure failures.

A typical example of carrying out the present invention is illustrated by the following description: a sheet of alumino-silicate glass having a thickness of ⅛" and another sheet of alumino-silicate glass having a thickness of ½", each having an approximate size of 18" x 24" and a coefficient of thermal expansion of $46 \times 10^{-7}$ per ° C., were cleansed by washing in acetone, isopropyl alcohol and water baths, consecutively. Xylene or the like could be used in place of the acetone. Upon drying, the ⅛" thick sheet was provided with an electrically conducting metal oxide film on one surface. Then two 1" wide strips of silver paint were baked onto the edge areas in contact with the electrically conducting film, to form the bus bars and thereafter lead-in wires were attached to said bus bars. A transparent organosilicon elastomer, sheet or layer, as described in the preferred embodiment above, having a thickness of .025" and the same size as the glass sheet, was positioned adjacent to the said electrically conducting film and bus bars. It should be noted that such a transparent organosilicon elastomer is presently available commercially in thicknesses of .025" and .040" only, and each was found to produce equally satisfactory results. It should be further noted that the results of tests indicate that the thickness need not be limited to these two, but may vary widely within the scope of this invention, without affecting the performance and quality of the product.

Thirteen sheets or layers of polyvinyl butyral each having a thickness of .020" and a coefficient of expansion of $126 \times 10^{-5}$ per ° C. longitudinally and $72 \times 10^{-5}$ per ° C. transversally, were rinsed in water, dried and positioned adjacent said sheet of transparent organosilicon elastomer, forming an interlayer having a total thickness of 0.285". A temperature sensing element with lead-in wires attached and a structural frame were disposed in the polyvinyl butyral portion of the interlayer. The second glass sheet was then positioned adjacent said sheets of polyvinyl butyral to complete the laminated structure.

The laminated structure was then clamped, to hold the components in position, and placed in a resilient container. After the air was evacuated from said container, it was sealed and placed in an autoclave containing suitable oil at room temperature. The oil was pressurized to between 100 p.s.i.g. and 150 p.s.i.g. while its temperature was increased to 300° F. The laminated structure was maintained in the autoclave, under these conditions, for a period of 45 to 90 minutes, at which time the pressure was released and the oil was cooled to room temperature. The total cycle required approximately 4 hours. This curing process produced a monolithic plastic interlayer having a strong mechanical bond to the glass sheets and excellent optical properties.

No deterioration of the structure or chipping or checking of the glass sheet edges was found after cold bath immersion tests, wherein the structure was exposed to temperatures lower than −70° F. Satisfactory results were also obtained in high temperature tests which were conducted up to the physical limit of the polyvinyl butyral.

It was found that a laminated glass structure, in which such a layer of transparent organosilicon elastomer is positioned between the polyvinyl butyral and the glass sheet, can be safely exposed to severe temperature conditions. The sheet of transparent organosilicon elastomer provides a highly adherent resilient layer which retains a high degree of flexibility regardless of temperature, and absorbs, through stretching or shearing, all forces created at the said interface without affecting the optical qualities and/or safety features of the structure.

It is obvious that a similar laminated structure can be used in applications other than air or space vehicle glazing. Some typical additional applications of the present invention are: automobile windows, test chamber windows, safety equipment, instrument windows, ship bridge windows, and many other applications.

Although the present invention has been described with respect to specific details of certain embodiments thereof, it is not intended that such details be limitations upon the scope of the invention except insofar as set forth in the following claims.

What is claimed is:

1. An article of manufacture comprising at least two sheets of glass and a glass-adherent interlayer, said interlayer composed of a combination of at least one sheet of transparent organosilicon elastomer and at least one sheet of a polyvinyl butyral, with at least one sheet of said transparent organosilicon elastomer positioned between and substantially coextensively with said polyvinyl butyral and at least one sheet of glass.

2. An article of manufacture comprising at least two sheets of glass, an electrically conducting film applied to at least one surface of at least one sheet of glass, and a glass-adherent interlayer, said interlayer composed of a combination of at least one sheet of transparent organosilicon elastomer and at least one sheet of a polyvinyl butyral, with at least one sheet of said transparent organosilicon elastomer positioned between and substantially coextensively with said polyvinyl butyral and said electrically conducting film.

3. An article of manufacture comprising at least two sheets of glass, an electrically conducting metallic oxide film applied to at least one surface of at least one sheet of glass, and a glass-adherent interlayer, said interlayer comprising a combination of at least one sheet of polyvinyl butyral and at least one sheet of a transparent organosilicon elastomer comprising a vulcanized mixture consisting essentially of (1) a filler of a finely divided solid having a pore volume of at least 3 cc. per g., said solid being a copolymer of (a) from 1 to 50 mol percent of $RSiO_{3/2}$ units wherein each R is an aliphatic hydrocarbon radical of less than 5 carbon atoms, (b) from 4 to 30 mol percent of $$(CH_3)_nSiO_{4-n/2}$$

units wherein $n$ is 2 or 3, and (c) from 46 to 95 mol percent of $SiO_2$ units, and (2) an organopolysiloxane in which at least 50 mol percent of the polymer units are $(CH_3)_2SiO$ units, any remaining polymer units being of the formula $$R'_mSiO_{4-m/2}$$

wherein each R' is a monovalent hydrocarbon radical of less than 10 carbon atoms and $m$ has an average value of 1.9 to 2.1 inclusive, with at least one sheet of said transparent organosilicon elastomer positioned between said polyvinyl butyral and said metallic oxide film.

References Cited by the Examiner

UNITED STATES PATENTS

| | | | |
|---|---|---|---|
| 2,552,955 | 5/1951 | Gaiser et al. | 161—199 |
| 2,628,927 | 2/1953 | Colbert et al. | 154—2.7 |
| 2,697,675 | 12/1954 | Gaiser | 161—39 |
| 2,837,454 | 6/1958 | Watkins et al. | 161—199 |
| 2,860,083 | 11/1958 | Nitzsche | 161—208 |
| 2,991,209 | 7/1961 | Worrall | 161—409 |
| 2,999,040 | 9/1961 | Burdick | 156—107 |
| 3,061,490 | 10/1962 | Ryan | 161—44 |

FOREIGN PATENTS

| | | |
|---|---|---|
| 586,028 | 3/1947 | Great Britain. |
| 778,348 | 7/1957 | Great Britain. |
| 828,381 | 2/1960 | Great Britain. |
| 937,254 | 9/1963 | Great Britain. |

MORRIS SUSSMAN, *Primary Examiner.*

A. WYMAN, EARL M. BERGERT, C. T. KRAFFT, *Examiners.*

W. J. VAN BALEN, W. F. ZAGURSKI, *Assistant Examiners.*